United States Patent [19]
Mita et al.

[11] Patent Number: 5,494,556
[45] Date of Patent: Feb. 27, 1996

[54] METHOD OF AND AN APPARATUS FOR SEPARATING A LIQUID MIXTURE

[75] Inventors: Masaaki Mita, Tokyo; Masumi Hino; Moriyoshi Kudo, both of Kitakyushu, all of Japan

[73] Assignees: Mitsubishi Chemical Corporation; Mitsubishi Kasei Engineering Company, both of Tokyo, Japan

[21] Appl. No.: 348,127

[22] Filed: Nov. 28, 1994

[30] Foreign Application Priority Data

Nov. 29, 1993 [JP] Japan ................................ 5-298187

[51] Int. Cl.⁶ .................................................. B01D 3/42
[52] U.S. Cl. ........................ 203/2; 159/47.1; 159/901; 159/DIG. 27; 202/160; 202/206; 203/18; 203/39; 203/71; 203/DIG. 9; 210/640; 568/913; 568/916; 568/918
[58] Field of Search ........................... 203/39, 71, 1, 203/2, 3, 18, DIG. 9, DIG. 18; 159/DIG. 27, 901, 47.1; 202/160, 172, 206, 173; 210/640; 95/46, 52; 96/6, 9; 568/913, 916, 918

[56] References Cited

U.S. PATENT DOCUMENTS

| | | | |
|---|---|---|---|
| 4,894,163 | 1/1990 | Watanabe et al. | 210/640 |
| 5,067,971 | 11/1991 | Bikson et al. | 95/52 |
| 5,120,900 | 6/1992 | Chen et al. | 210/644 |
| 5,151,190 | 9/1992 | Seiryo | 210/640 |
| 5,221,477 | 6/1993 | Melcher et al. | 210/650 |
| 5,383,956 | 1/1995 | Prasad et al. | 96/9 |
| 5,427,687 | 6/1995 | Blum et al. | 210/640 |

FOREIGN PATENT DOCUMENTS

| | | |
|---|---|---|
| 0062494 | 10/1982 | European Pat. Off. . |
| 0294827 | 12/1988 | European Pat. Off. . |
| 0457981 | 11/1991 | European Pat. Off. . |

OTHER PUBLICATIONS

Database WPI, Derwent Publications Ltd., AN 92–402126, JP-A-04 298 222, Oct. 22, 1992.

Primary Examiner—Virginia Manoharan
Attorney, Agent, or Firm—Oblon, Spivak, McClelland, Maier & Neustadt

[57] ABSTRACT

A method of separating a liquid mixture wherein the liquid mixture is heated; the heated liquid mixture is supplied to a pervaporation membrane module to separate a permeable component of the liquid; a portion of non-permeated liquid is circulated through a circulation pipe into a liquid mixture feeding pipe before a heater, and the remaining portion of the non-permeated liquid is extracted to the outside of the system, and wherein the temperature of the liquid in the liquid mixture feeding pipe in which the non-permeated liquid has been mixed with the liquid mixture or in the circulation pipe for the non-permeated liquid, is measured, and when the measured temperature is out of a predetermined range, new supply of the liquid mixture and/or extraction of the non-permeated liquid is stopped.

15 Claims, 4 Drawing Sheets

METHOD OF AND AN APPARATUS FOR SEPARATING A LIQUID MIXTURE

The present invention relates to a method of separating a liquid mixture by pervaporation and an apparatus suitable for conducting the method. More particularly, the present invention relates to a method of and an apparatus for separating a liquid mixture which have good response to a change in the composition of the liquid mixture.

As a method of separating a liquid mixture, there has been known a method called pervaporation wherein a separation membrane which has a special affinity to a specified component in a liquid mixture is used, the liquid mixture is supplied on a side (a feed side) of the membranes and the pressure of the other side (a permeate side) is reduced so as to keep the partial vapor pressure of a permeated component in the permeate side to be smaller than the equilibrium vapor pressure of the component at the feed side, whereby the specified component is permeated for separation through the membrane from the feed side to the permeate side in a gaseous state.

When the pervaporation method is conducted, the feed side of the separation membrane is in contact with the supplied liquid (the liquid mixture undergoing separating operation) and the permeate side of the membrane (through which the permeable component is passed) is reduced in pressure. When the permeable component is permeated from the feed side to the permeate side, it takes latent heat of vaporization from the liquid. Accordingly, the supplied liquid (at the feed side) should be heated. Further, since the permeated component (at the permeate side) is in a gaseous phase, a cooling device is usually provided at the permeate side to condense the permeated component.

In the pervaporation method, it is preferable that the temperature of the liquid mixture is increased so that the equilibrium vapor pressure at the feed side becomes higher. However, there is a drawback that the temperature of the liquid mixture decreases due to the latent heat of vaporization of the liquid. As a method of efficiently supplying a heat quantity corresponding to the latent heat of vaporization, there has been known a method of circulating a portion of non-permeated liquid (U.S. Pat. No. 5,151,190).

In the pervaporation method, generally, the composition of the liquid is watched and controlled as well as the monitoring and controlling of the temperature of the liquid. For instance, in a pervaporation method using a pervaporation membrane capable of selectively permeating water from a liquid mixture composed of isopropyl alcohol (IPA) and water, when the temperature of the liquid is too high, the life of the membrane is shortened due to the deterioration of the membrane, and when the temperature is too low, the efficiency of separation of water becomes poor. When the content of water is too much in the liquid mixture, it is difficult to separate the water completely, and the composition of the final product becomes inferior. Accordingly, in the conventional technique, the temperature of the liquid to be supplied, the composition of the liquid to be supplied and the composition of the liquid as a final product were monitored, and when the monitored values are out of predetermined ranges, the operation was stopped. Therefore, in the conventional technique, the temperature of the liquid was measured with a thermometer and the composition of the liquid was measured with a density meter, a resistivity meter or the like.

It is an object of the present invention to provide a method of and an apparatus for separating a liquid mixture efficiently with a simple structure regardless of changes of the temperature and the composition of the liquid mixture.

In accordance with the present invention, there is provided a method of separating a liquid mixture wherein the liquid mixture is heated; the heated liquid mixture is supplied to a pervaporation membrane module to separate a permeable component of liquid; a portion of non-permeated liquid is circulated through a circulation pipe into a liquid mixture feeding pipe before a heater, and the remaining portion of the non-permeated liquid is extracted to the outside of the system, the method being characterized in that the temperature of the liquid in the liquid mixture feeding pipe in which the non-permeated liquid has been mixed with the liquid mixture or in the circulation pipe for the non-permeated liquid, is measured, and when the measured temperature is out of a predetermined range, new supply of the liquid mixture and/or extraction of the non-permeated liquid is stopped.

In accordance with the present invention, there is provided a method of separating a liquid mixture with an apparatus having at least two pervaporation membrane modules which are connected in a multi-stage form wherein the liquid mixture is heated and supplied to the pervaporation membrane module of the first stage; a portion of non-permeated liquid is circulated through a circulation pipe into a liquid mixture feeding pipe before a heater, and the remaining portion of the non-permeated liquid is supplied to the pervaporation membrane module of the next stage, the method being characterized in that the temperature of the liquid in the liquid mixture feeding pipe, in which the non-permeated liquid discharged from the pervaporation membrane module of the first stage has been mixed with the liquid mixture, or in the circulation pipe for the non-permeated liquid is measured, and when the measured temperature is out of a predetermined range, new supply of the liquid mixture at the first stage and/or extraction of the non-permeated liquid at the last stage is stopped.

In accordance with the present invention, there is provided a pervaporation separation apparatus which comprises:

a pervaporation membrane module, a liquid mixture feeding pipe, a heater disposed in the liquid mixture feeding pipe, a circulation pipe for non-permeated liquid, a thermometer disposed in the liquid mixture feeding pipe, in which a circulation liquid has been mixed with the non-permeated liquid, or in the circulation pipe for the non-permeated liquid, and a controller for stopping new supply of the liquid mixture and/or extraction of the non-permeated liquid when the thermometer indicates a value which is out of a predetermined range.

DESCRIPTION OF THE PREFERRED EMBODIMENTS

Preferred embodiments of the present invention will be described in detail with reference to the drawings.

Figure 1:
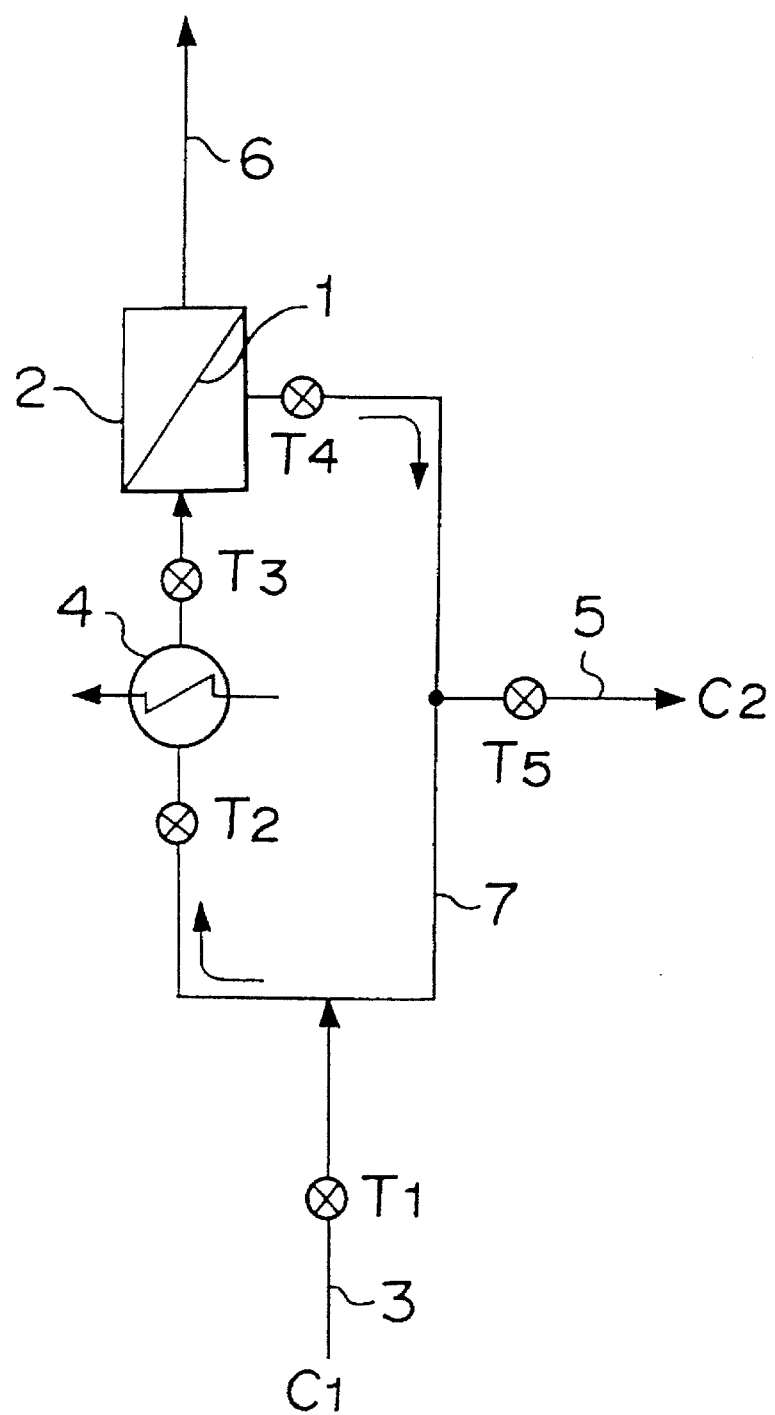
FIG. 1 is a diagram showing an embodiment of the apparatus used for conducting the method of the present invention.

In FIG. 1, reference numeral 1 designates a pervaporation separating membrane, numeral 2 designates a pervaporation membrane module, numeral 3 designates a liquid mixture feeding pipe, numeral 4 designates a heater, numeral 5 designates a pipe for extracting non-permeated liquid, numeral 6 designates a permeated liquid discharging pipe and numeral 7 designates a circulation pipe for non-permeated liquid. The heater 4 is provided with a controller for maintaining the temperature of the liquid to be constant in order to achieve stable separation performance, and for limiting the quantity of heat from the heater 4 within the upper and lower limits.

Any kind of liquid mixture can be treated in the present invention as far as the pervaporation method is applicable. However, a liquid mixture having a large difference of specific heat is preferably used. For instance, a liquid mixture composed of an organic solvent and water, specifically, a liquid mixture composed of alcohol and water, and more specifically, a liquid mixture composed of IPA and water, is desirable.

The separation membrane may be such one that is usually used for the pervaporation method to separate a liquid mixture. As the separation membrane used for the pervaporation method, there are exemplified a cellulose type, a polyimide type, a polysulfone type, a chitosan type, a silicone type separation membrane and so on. When a liquid mixture composed of an organic solvent and water is used, it is preferable to use a membrane capable of selectively passing water, such as the cellulose type separation membrane, the polyimide type separation membrane or the polysulfone type separation membrane. As the shape of the separation membrane, there are exemplified a hollow fiber type, a flat type, a spiral type and so on.

The ratio of a quantity of liquid (a) extracted from the extraction pipe 5 to a quantity of liquid (b) to be circulated through the circulation pipe 7 is usually a:b =1:1 or more, preferably 1:5–200.

When the quantity of liquid to be circulated is too small, a sufficient amount of heat corresponding to the latent heat cannot be supplied to the liquid, and it is greatly affected by the change in the composition of the supply liquid. On the other hand, when the quantity of the liquid to be circulated is too large, the size of the separation membrane module and the pipe has to be large.

For the heater, steam or electricity can be used. It is preferable to use an electric heater. It is preferable to set the upper and lower limits for the heat quantity of the heater.

The temperature of the liquid is measured in the circulation pipe or in the feeding pipe after the circulation liquid has been mixed with the supply liquid. Namely, the temperature measurement is conducted at a position T2, T3 or T4 in FIG. 1. Further, the temperature measurement can be conducted at a position T5 if the extraction pipe is not provided with a heater or a cooler (because in that case there is no temperature difference between the extraction pipe and the circulation pipe). In consideration of avoiding the thermal deterioration of the separation membrane, it is preferable to measure the temperature of the supplied liquid after it has been heated.

The thermometer may be a known one such as a thermocouple. When a value obtained by the measurement of the temperature of the liquid is out of a predetermined temperature range, new supply of the liquid mixture and/or extraction of the non-permeated liquid is stopped.

An embodiment of the method of separation wherein the temperature of the liquid mixture is measured at a position T3 will be described with reference to FIG. 1.

In normal operation, the liquid mixture to be separated is supplied from the liquid mixture feeding pipe 3 at a predetermined pressure elevated by means of a pump (not shown). Then, the liquid mixture is mixed with non-permeated liquid and is passed through the circulation pipe 7 in the direction of an arrow mark to the heater 4, where it is heated to a predetermined temperature. At the position T3, the temperature of the liquid mixture is checked with a thermometer such as a thermocouple or the like. Then, the liquid mixture is fed to the pervaporation membrane module 2. A vacuum pump (not shown) is provided in the permeated liquid discharge pipe 6 so that the pressure of the permeate side of the module 2 is reduced. Accordingly, a permeable component in the liquid mixture permeates in a gaseous state through the pervaporation membrane 1 and is discharged from the permeated liquid discharge pipe 6. Non-permeated liquid in the liquid mixture is fed to the circulation pipe 7. A portion of the non-permeated liquid is extracted from the non-permeated liquid extraction pipe 5 to the outside of the system and the remaining portion is again fed to the module 2 through the heater 4.

When there is a change in the composition of the liquid mixture supplied through the liquid mixture feeding pipe 3, a heat quantity necessary for raising the temperature of the liquid mixture changes. If a change in the composition is small, a controller functions to change the heat quantity supplied by the heater 4. However, if a change in the composition is large, it is difficult to keep the temperature of the liquid mixture constant by changing the heat quantity supplied by the heater 4 whereby the temperature of the liquid at the position T3 changes. When such change of temperature is detected at T3, new supply of the liquid mixture through the feeding pipe 3 is stopped and/or extraction of the non-permeated liquid through the pipe 5 is stopped.

In a case that a liquid mixture composed of an organic solvent and water is used and a separation membrane capable of selectively permeating water is used and when the extraction of the non-permeated liquid through pipe 5 is stopped as described above, only the organic solvent having a reproducible purity can be taken out from the system. This stabilizes the quality of a product.

Further, when new supply of the liquid mixture through the liquid mixture feeding pipe 3 is stopped, only the non-permeated liquid is circulated through the circulation pipe 7 to the module 2. This stabilizes the separating operation and the composition of the liquid in the circulation pipe 7 can be stabilized. It is preferable that both the new supply and the extraction be stopped.

Figure 2:
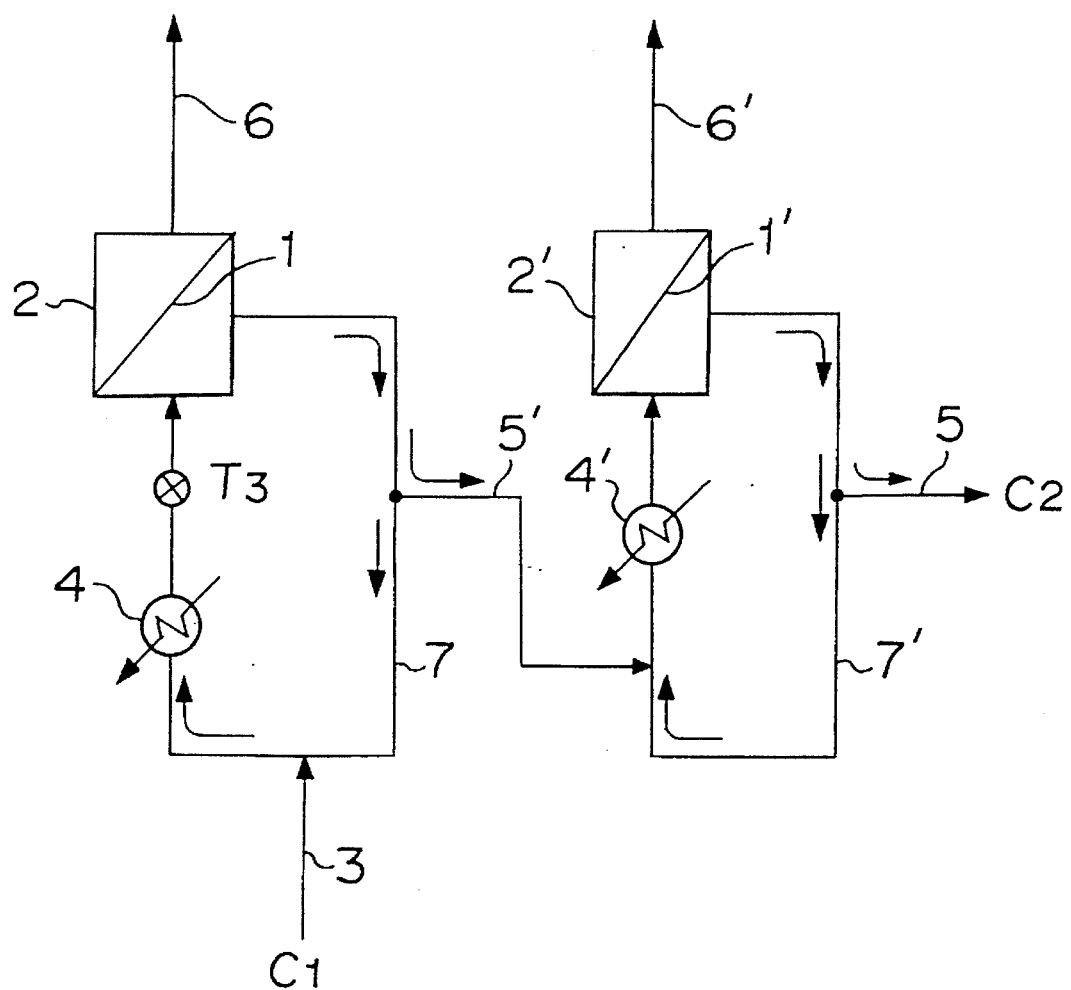
FIG. 2 is a diagram of a second embodiment of the apparatus used for conducting the method according to the present invention.

The second embodiment of the present invention will be described with reference to FIG. 2. FIG. 2 shows a separation apparatus comprising two pervaporation membrane modules 2, 2' which constitute the first and the second stages wherein the position of measuring the temperature of the liquid is just behind a first heater and a circulation pipe is provided also for the second stage. However, some modifications may be made on this embodiment.

In normal operations, the liquid mixture as raw material is supplied through the pipe 3 in which it is mixed with the non-permeated liquid; the mixed liquid is fed to the first heater 4 where the temperature of the liquid is raised to a predetermined value, and is further fed to the first pervaporation membrane module 2. A permeable component in the liquid mixture passes in a gaseous state through the pervaporation membrane 1 and is discharged through the pipe 6. A portion of non-permeated liquid is extracted through an extraction pipe 5' to be fed to a circulation pipe 7' in the second stage. The remaining portion of the non-permeated liquid is mixed with the liquid mixture of new supply and the mixed liquid is fed to the heater 4 as described before. On the other hand, the non-permeated liquid fed from the second module 2' to the circulation pipe 7' is mixed with the non-permeated liquid fed through the pipe 5', and the mixed liquid is fed to a second heater 4' where the temperature of the liquid is raised to a predetermined value, and thereafter, the mixed liquid is introduced into the second pervaporation membrane module 2'. A permeated component in the mixed liquid is extracted through a pipe 6' and a non-permeated component of the liquid is fed to the circulation pipe 7'. A portion of the non-permeated liquid is extracted through the pipe 5 and the remaining portion is again fed to the heater 4'.

When there is a large change in the composition of the liquid mixture to be supplied, it is difficult to adjust the temperature of the liquid mixture by heat quantity control by the heater 4, and therefore, the temperature of the liquid at T3 changes. In this case, new supply of the liquid mixture to the first stage through the pipe 3 and/or extraction of the non-permeated liquid through the pipe 5 in the last stage is stopped. Alternatively, in the same manner as the first embodiment, new supply of the liquid mixture through the pipe 3 in the first stage and/or extraction of the non-permeated liquid through the pipe 5' in the first stage may be stopped. Preferably, both the new supply to the first stage and the extraction in the last stage should be stopped and more preferably, new supply and extraction at each stage should be stopped.

Figure 3:
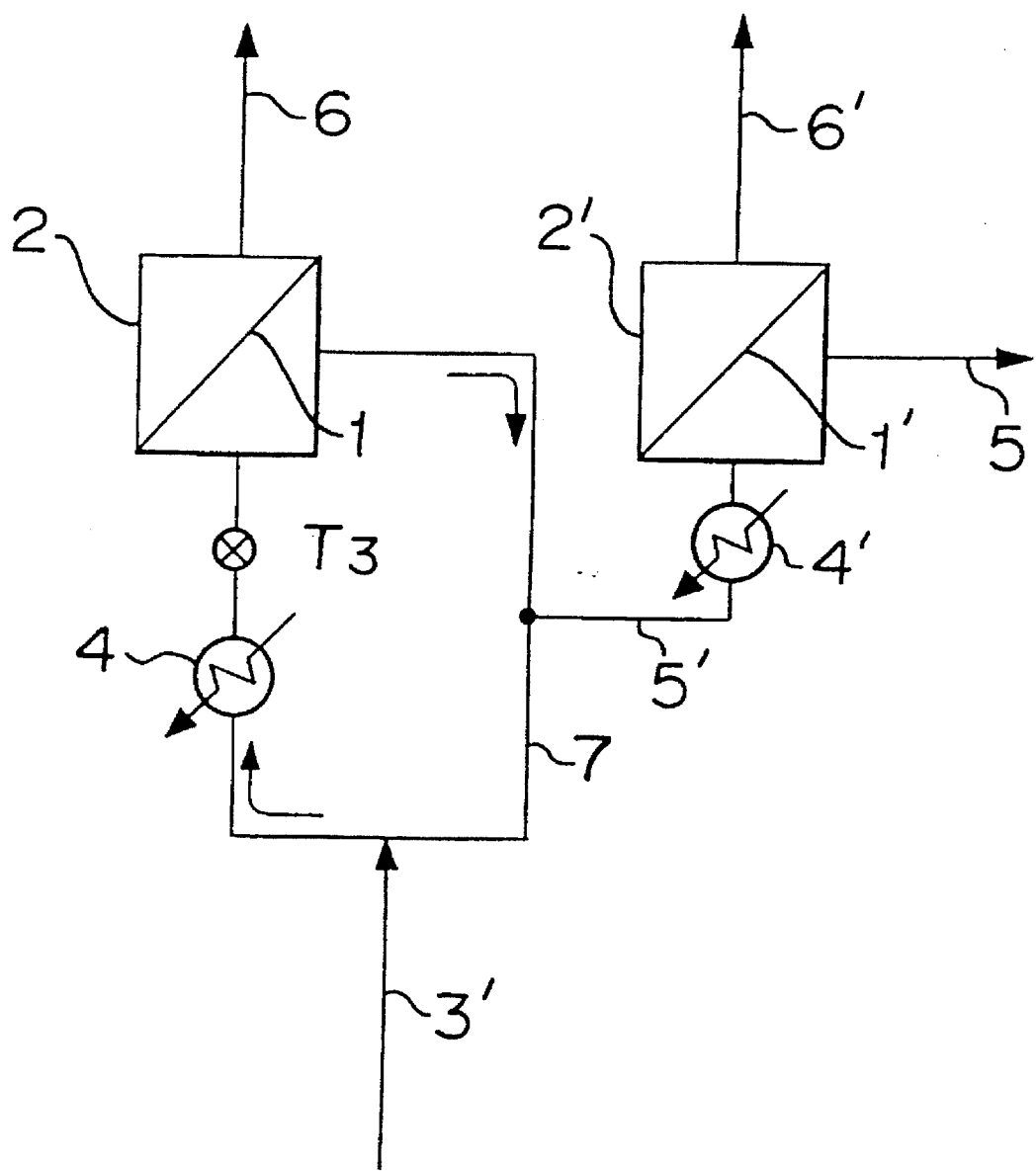
FIG. 3 is a diagram of a third embodiment of the apparatus used for conducting the method according to the present invention.

Further, as a modification in the second embodiment, the circulation pipe may be omitted in the second stage and successive stages as shown in FIG. 3. In this case, extraction of the non-permeated liquid through the pipe 5' is preferably stopped at the same time of stopping the extraction through the pipe 5.

Figure 4:
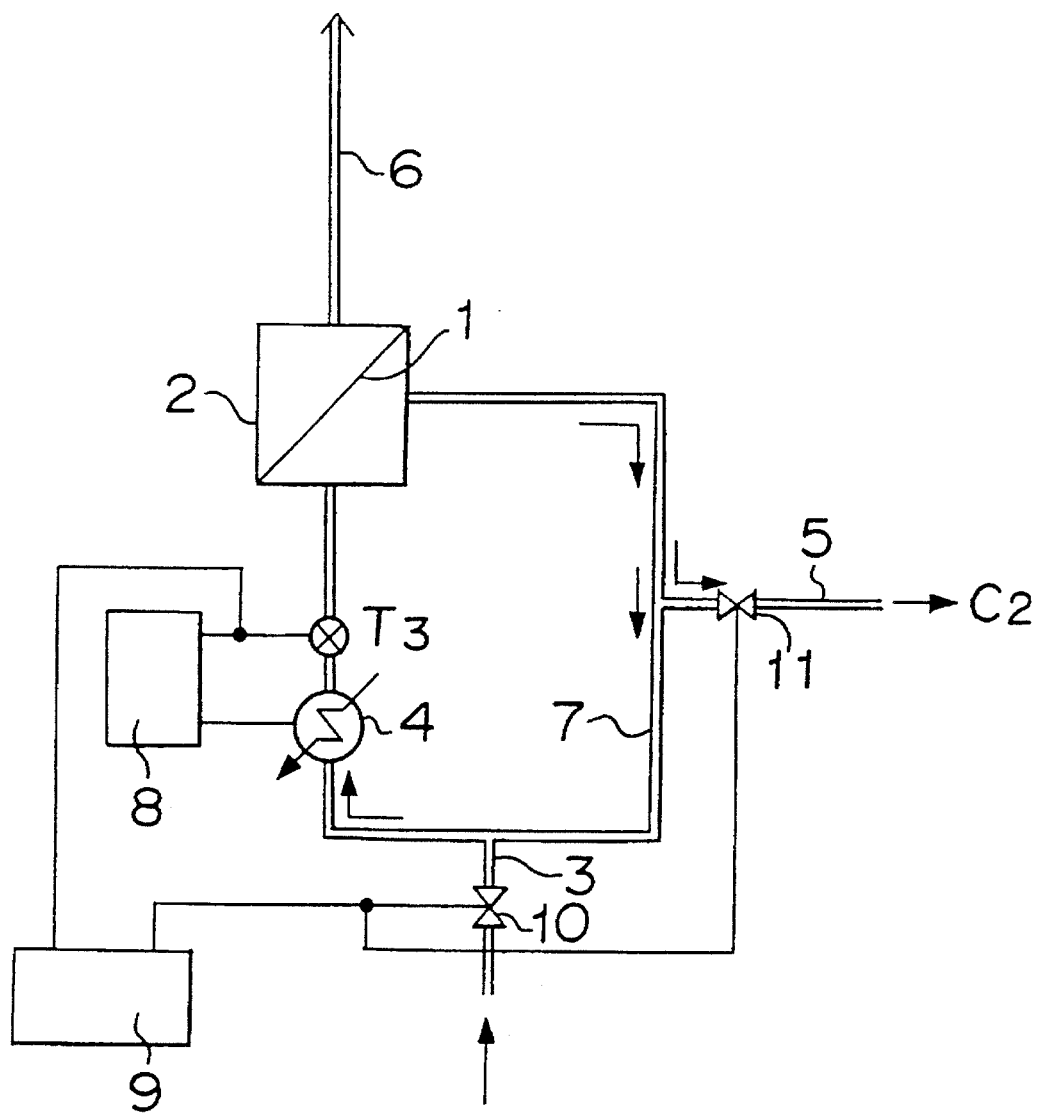
FIG. 4 is a diagram of a fourth embodiment of the apparatus used for conducting the method according to the present invention.

In the next, the third embodiment of the present invention will be described with reference to FIG. 4.

Switching valves 10 and 11 capable of easily opening and closing such as solenoid valves are disposed in the pipes 3 and 5. A thermometer such as a thermocouple is provided at T3.

Data of temperature obtained at T3 are inputted, on one hand, into a controller 8 by which the output of the heater 4 is controlled and, on the other hand, into a controller 9 by which the valves 10, 11 are opened and closed. The controller 8 controls the temperature of the liquid at T3 so as to be a set value by changing the output of the heater 4 when the temperature of the liquid at T3 changes. A conventional PID controller can be used for the controllers.

The controller 9 closes the valve 10 and/or the valve 11 when the temperature of the liquid at T3 is out of a predetermined temperature range, and opens the valves 10 and 11 when the temperature is within a predetermined range.

When the composition of the liquid mixture to be supplied changes, the vaporization latent heat also changes. When the vaporization latent heat increases, the heat quantity supplied by the heater increases. However, since there is an upper limit of the heat quantity, the heat quantity cannot correspond to the change in the vaporization latent heat. Accordingly, the temperature of the liquid mixture decreases. On the other hand, when the vaporization latent heat decreases, the heat quantity supplied by the heater also decreases. However, since there is a lower limit of the heat quantity, it cannot correspond to the change in the vaporization latent heat. Accordingly, the temperature of the liquid mixture increases. Therefore, a change in the composition of the liquid mixture can be detected indirectly.

Besides the change in the composition of the liquid mixture to be supplied, a change in the composition of the liquid to be circulated can also be detected. Namely, a change in the composition of the non-permeated liquid to be extracted can be indirectly detected from a change in the temperature.

When there is a change in the composition of the liquid mixture to be supplied or of the liquid to be circulated, extraction of the non-permeated liquid and/or new supply of the liquid mixture is stopped to thereby increase relatively the ratio of an amount of the non-permeated liquid to be circulated, whereby the change in the composition of the liquid mixture to be supplied to the membrane module can be made small.

When two or more number of membrane modules are used, it is preferable to measure the temperature of the liquid mixture in the first stage since it quickly responds to the change in the composition of the liquid mixture.

Now, the present invention will be described in further detail with reference to Example. However, it should be understood that the present invention is by no means restricted to such specific example.

COMPARATIVE EXAMPLE 1

With use of the apparatus shown in FIG. 1, tests were conducted to separate a liquid mixture composed of IPA and water while measuring the temperature at T1 through T5. A heater having a power of 0.85 kW in the upper limit of heat quantity was used. The temperature of the liquid mixture was controlled by a controller to be constant (about 85° C.). The flow rate of newly supplied liquid mixture was 7 kg/Hr and an amount of circulation of the liquid was 20 l/min (about 950 kg/Hr).

In the composition of the liquid mixture at an initial stage, IPA was 92.4%. Later, the composition was changed to IPA: 76.7%. As a result, the temperatures at T2 through T5 were reduced and the concentration of IPA in the non-permeated liquid was reduced. Conditions of tests and results are shown in Table 1.

TABLE 1

|  | Initial condition | After change |
|---|---|---|
| Temperature (°C.) | | |
| T1 | 25.0 | 25.0 |
| T2 | 83.9 | 45.0 |
| T3 | 85.0 | 46.0 |
| T4 | 84.5 | 45.1 |
| T5 | 84.3 | 45.0 |
| IPA concentration(%) | | |
| Feeding pipe C1 | 92.4 | 76.7 |
| Extraction pipe C2 | 99.2 | 90.5 |

EXAMPLE 1

In Comparative Example 1, when the temperature at T3 was out of a range of 70° C.–90° C., new supply of the liquid mixture and extraction of the non-permeated liquid were stopped and the new supply and the extraction were restarted at a time point when the temperature was within that range. As a result, the concentration of IPA in the extraction pipe was usually 98% or more.

The method and the apparatus according to the present invention are extremely useful in industrial fields since it can respond to a change in the composition of liquid without using an expensive measuring device such as a density meter, a resistivity meter or the like.

What is claimed is:

1. A method of separating a liquid mixture comprising the steps of:

heating the liquid mixture;

supplying the heated liquid mixture to a pervaporation membrane module to separate a permeable component of the liquid;

circulating a portion of the non-permeated liquid through a circulation pipe into a liquid mixture feeding pipe before a heater and extracting the remaining portion of the non-permeated liquid to the outside of the system;

measuring the temperature of the liquid in the liquid mixture feeding pipe, in which the non-permeated liquid has been mixed with the liquid mixture, or in the circulation pipe for the non-permeated liquid; and stopping a new supply of the liquid mixture and/or the extraction of the non-permeated liquid when the measured temperature is out of a predetermined range.

2. The method of separating a liquid mixture according to claim 1, wherein the liquid mixture is composed of an organic solvent and water, and a pervaporation membrane disposed in the pervaporation membrane module is a membrane capable of selectively permeating water.

3. The method of separating a liquid mixture according to claim 2, wherein the liquid mixture is composed of alcohol and water.

4. The method of separating a liquid mixture according to claim 3, wherein the liquid mixture is composed of isopropyl alcohol and water.

5. The method of separating a liquid mixture according to claim 1, wherein the position of measuring the temperature of the liquid is in the liquid mixture feeding pipe after the liquid has been heated.

6. The method of separating a liquid mixture according to claim 1, wherein means for heating the liquid mixture is provided with a controller for maintaining the temperature of the liquid to be constant and for setting the upper and lower limits of the heat quantity of the heating means.

7. The method of separating a liquid mixture according to claim 1, wherein an amount of the non-permeated liquid to be circulated is 5 to 200 times as much as an amount of the non-permeated liquid to be extracted.

8. A method of separating a liquid mixture using an apparatus having at least two pervaporation membrane modules connected in multi-stage form, comprising the steps of:

heating the liquid mixture;

supplying the heated liquid mixture to a pervaporation membrane module of a first stage;

circulating a portion of the non-permeated liquid through a circulation pipe into a liquid mixture feeding pipe before a heater and supplying the remaining portion of the non-permeated liquid to the pervaporation membrane module of a next stage;

measuring the temperature of the liquid in the liquid mixture feeding pipe, in which the non-permeated liquid discharged from the pervaporation membrane module of the first stage has been mixed with the liquid mixture, or in the circulation pipe for the non-permeated liquid; and stopping a new supply of the liquid mixture to the first stage and/or extraction of the non-permeated liquid at a last stage when the measured temperature is out of a predetermined range.

9. The method of separating a liquid mixture according to claim 8, wherein the liquid mixture is composed of an organic solvent and water, and a pervaporation membrane disposed in the pervaporation membrane module is a membrane capable of selectively permeating water.

10. The method of separating a liquid mixture according to claim 8, wherein the position of measuring the temperature of the liquid is in the liquid mixture feeding pipe after the liquid has been heated.

11. The method of separating a liquid mixture according to claim 8, wherein means for heating the liquid mixture is provided with a controller for maintaining the temperature of the liquid to be constant and for setting the upper and lower limits of heat quantity of the heating means.

12. A pervaporation separation apparatus which comprises:

a pervaporation membrane module, a liquid mixture feeding pipe, a heater disposed in the liquid mixture feeding pipe, a circulation pipe for non-permeated liquid, a thermometer disposed in the liquid mixture feeding pipe, in which a circulation liquid has been mixed with the non-permeated liquid, or in the circulation pipe for the non-permeated liquid, and a controller for stopping new supply of the liquid mixture and/or extraction of the non-permeated liquid when the thermometer indicates a value which is out of a predetermined range.

13. The pervaporation separation apparatus according to claim 12, wherein the liquid mixture is composed of an organic solvent and water, and a pervaporation membrane disposed in the pervaporation membrane module is a membrane capable of selectively permeating water.

14. The pervaporation separation apparatus according to claim 12, wherein the position of measuring the temperature of the liquid is in the liquid mixture feeding pipe after the liquid has been heated.

15. The pervaporation separation apparatus according to claim 12, wherein means for heating the liquid mixture is provided with a controller for maintaining the temperature of the liquid to be constant and for setting the upper and lower limits of heat quantity of the heating means.

* * * * *